March 9, 1937.  G. M. THURSTON  2,073,459
TEMPERATURE CONTROL SYSTEM AND METHOD
Filed Feb. 27, 1934
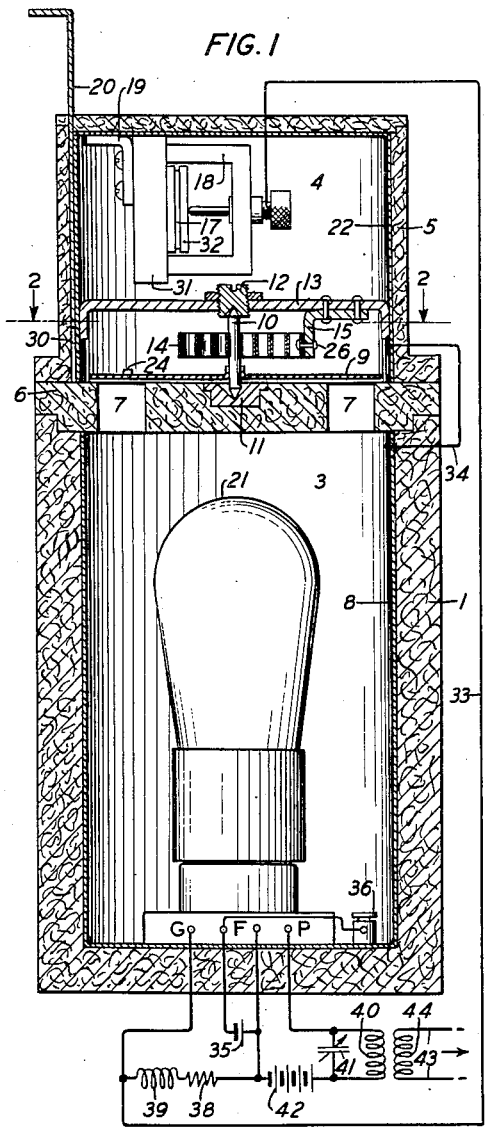
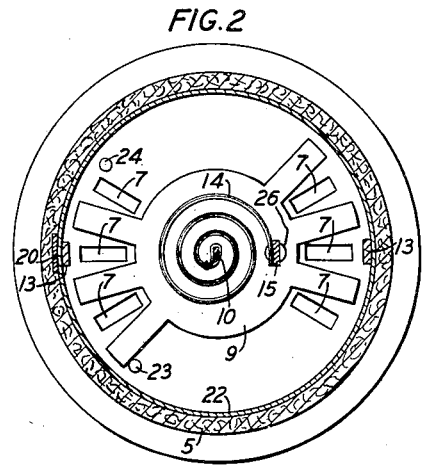
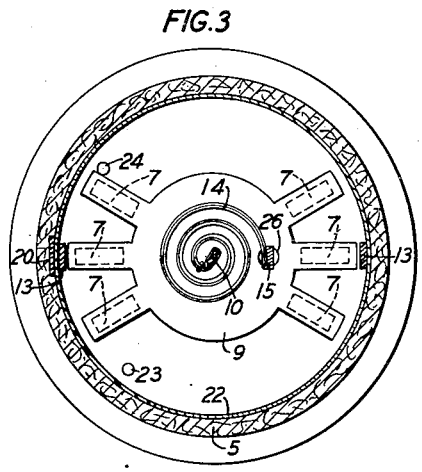
INVENTOR
G. M. THURSTON
ATTORNEY.

Patented Mar. 9, 1937

2,073,459

UNITED STATES PATENT OFFICE 2,073,459

TEMPERATURE CONTROL SYSTEM AND METHOD

George M. Thurston, New York, N. Y., assignor to Bell Telephone Laboratories, Incorporated, New York, N. Y., a corporation of New York Application February 27, 1934, Serial No. 713,240

23 Claims. (Cl. 236—1)

This invention relates to temperature control and more particularly to a system and method for maintaining the temperature of an enclosed space relatively constant.

An object of this invention is to obtain economically a constant temperature in an enclosed space.

Another object of this invention is to afford temperature stability to mechanical vibratory elements efficiently and economically.

A more particular object of this invention is to maintain the temperature of a piezoelectric crystal employed in an oscillator substantially constant.

In systems in which mechanically controlled oscillators are employed, the maintenance of the temperature of the mechanical member relatively constant is particularly necessary for the efficient operation of these systems. Frequently, however, considerable energy must be supplied to maintain the mechanical member at a constant temperature. This factor is especially important in mobile apparatus, such as the transmitters and receivers of police radio and airplane communication systems wherein a limited supply of energy is available. In many of the police radio systems, for example, the energy required to heat the piezoelectric crystal of the oscillator for reception is approximately one-third of that required for the whole system.

In accordance with this invention the energy dissipated by an electrical system in its normal operation is utilized to maintain the temperature of a thermal responsive element of the system at a relatively constant temperature. The energy dissipated by the whole or part of the system is supplied intermittently as required to the thermal responsive element. One method of accomplishing the temperature maintenance of the thermal responsive element is to store the energy dissipated by the system and to supply the energy so dissipated to a heat retaining chamber containing the thermal responsive element. The amount of energy supplied to the chamber is regulated by the temperature of the heat retaining chamber.

This temperature control system and method is particularly adaptable to mobile apparatus wherein the maintenance of a part of the apparatus at a relatively constant temperature is required and in which the energy supply is limited. In police radio systems, for example, the space discharge devices and other parts of the system dissipate considerable heat. These parts are placed in a heat insulated chamber. The piezoelectric crystal of the system is inserted in another chamber. A heat insulated wall containing a series of openings separate the two chambers. A valve responsive to temperature changes in the piezoelectric chamber permits or prevents the heated air from the chamber containing the heat dissipating apparatus from entering the piezoelectric chamber. Accordingly, the heated air from the chamber containing the heat dissipating apparatus is permitted to enter the piezoelectric chamber when the temperature of the latter is below that required and is prevented from entering the piezoelectric chamber when the desired temperature in the latter has been attained.

A more comprehensive understanding of this invention is obtained by reference to the accompanying drawing in which:

Fig. 1 represents a cross-sectional view in front elevation of an embodiment of this invention for the maintenance of a piezoelectric element of an oscillator at a constant temperature;

Fig. 2 illustrates a cross-sectional view of the embodiment shown in Fig. 1 along the line 2—2 when the temperature of the piezoelectric element is below that desired;

Fig. 3 is a similar cross-sectional view to that shown in Fig. 2 when the temperature of the element is above that required.

In Fig. 1, the numeral 1 represents the walls of a heat retaining chamber 3. These walls consist of any suitable heat insulating material. Another heat retaining chamber 4 is constructed of heat insulated walls 5. The walls 5 of chamber 4 are made of similar material to that of walls 1 of the chamber 3, but are preferably thinner in cross-section. Both the walls 1 of chamber 3 and the walls 5 of chamber 4 contain a metallic lining indicated respectively by the numerals 8 and 22. A common wall 6 composed of heat insulating material separates chambers 3 and 4. Means for supplying the fluid medium of chamber 3 to the chamber 4 intermittently as required are provided. This specific means comprise a plurality of apertures 7—7 in a circular pattern in the common wall 6. These apertures are opened and closed by a valve comprising a disc 9. Any other means which supplies the heated fluid medium of chamber 3 to chamber 4 when necessary may be employed for this purpose. The disc 9 has elevations on its periphery so that when the disc is rotated in one direction the apertures are closed and when rotated in another direction they are opened. The disc 9 is fixedly attached at its center to a rotatable shaft 10. The shaft 10 is supported at one end by the socket 11 in the common wall 6 and at the other end by a socket 12 fixedly held by a shelf 13. The shelf 13 is attached to the metallic lining 22 of the chamber 4.

The heat dissipating parts of a conventional piezoelectric oscillator represented in Fig. 1 by the heated space discharge device 21 are inserted in chamber 3, while the piezoelectric crystal 17 is placed in chamber 4. The crystal 17 is supported in the chamber 4 by the holder 18 attached to the metallic lining by means of the bracket 19. One of the electrodes 31 in contact with the piezo electric crystal 17 and forming part of the holder 18 is grounded through the bracket 19 to the metallic lining 22 of chamber 4. The other electrode 32 insulated from other portions of the holder 18 is connected to the control electrode of the space discharge device by means of the wire 33 to the control electrode terminal G of the device 21. A wire 34 connects the metallic lining 22 of chamber 4 to the metallic shield 8 of chamber 3. The cathode of the space discharge device is supplied with energy from the battery 35 connected to the cathode terminals F, F. The negative cathode lead is grounded by a connection to the lining 8 of chamber 3 at terminal 36. The control electrode is connected to the cathode through the grid leak resistance 38, the inductance 39 to the control electrode terminal G. An inductance 40 and variable condenser 41 are in the anode circuit of the oscillator and are connected to the anode of space discharge device 21 through the anode terminal P. The battery 42 serves as the supply for anode current. The oscillations produced from the oscillator are withdrawn by the line 43, which is inductively coupled by means of the coil 44 to the inductance 40. The piezoelectric crystal 17 controls, in a well known manner, the frequency of the oscillator. The space device 21 serving its normal function in the piezoelectric oscillator dissipates considerable energy which is ordinarily wasted. Other parts of the oscillator or of the entire system with which the oscillator is associated which dissipate heat in their normal operation may also be included in chamber 3.

A movable metallic plate 20 partly or totally contained in the chamber 4 and partly or totally exposed to the ambient temperature, as desired, is also provided. The metallic plate preferably has the same configuration as part of the inside of the chamber in which the heat responsive element is inserted. In the particular embodiment illustrated in Figs. 1 and 2, the transverse section of the plate is an arc. The plate is longitudinally slidable in and fits tightly into a groove 30 in the wall 5 of the chamber 4. The groove 30 is immediately adjacent to the inner metallic lining 22 of the chamber 4. The plate 20 is constructed so that the relative proportion in the chamber and that exposed to the ambient temperature may be varied.

Fixedly attached to the shaft 10 at one end is a bimetallic strip 14 consisting of brass and iron. Any bimetallic strip, the constituent elements of which have a different coefficient of thermal expansion is satisfactory. Strip 14 is wound in the form of a coil. The other end of the strip is held to the framework of the chamber by means of the set screw 26 of bracket 15 attached to the shelf 13.

Other thermostatically controlled devices responsive to temperature changes in the piezoelectric crystal chamber 4 which open and close the apertures may be employed instead of the valve heretofore described.

The construction of the thermostatically controlled valve can be more readily seen by reference to Figs. 2 and 3. The circular pattern of the apertures 7—7 in the common wall section are more clearly shown. The valve or disc 9 is in a position in which the apertures 7—7 are open between the chambers in Fig. 2, while Fig. 3 shows the disc 9 covering the apertures. Two stops 23 and 24 limit the rotation of the door to an arc slightly greater than the radial width of one of the apertures.

The operation of the system is as follows: In the normal operation of the oscillator, the heat dissipated by the various parts, such as the vacuum tube 21, heats the air or other fluid medium in the chamber 3. The longitudinal and transverse expansion of the brass of the bimetallic coil 14 is greater than that of iron. The thermostatically controlled element constructed of the bimetallic strip 14 in the form of a coil is fixedly attached at one end to the bracket 15 by the set screw 26 and at the other end to the shaft 10. Since the brass is on the inside of the bimetallic strip 14 the coil expands when the temperature increases and contracts with a decrease in temperature. As a consequence of this expansion and contraction of the coil 14 with change in the temperature, a tension is produced on the shaft 10 which rotates the door 9 in a clockwise direction with increases in temperature and in a counter-clockwise direction with decreases in temperature. The shaft 10 rotates the disc 9 with its elevation to open and close the aperture 7—7. The coil 14 is adjusted by the set screw 26 and a groove in the coil so that when the piezoelectric crystal is at the desired temperature, the elevation on the disc 9 covers the apertures 7—7, while when the temperature has fallen below that required the apertures between the chambers are not covered.

During the operation of the oscillator considerable heat is dissipated by various parts, such as the vacuum tube, represented in the drawing by the numeral 21. This heat is stored in the chamber 3. If the piezoelectric crystal 17 is below the temperature desired the disc 9 is in a position indicated at Fig. 2. The aperture 7—7 being open the air or other fluid medium heated by the dissipated energy in the apparatus contained in chamber 3 passes into the chamber 4. When the temperature of the chamber 4 containing the piezoelectric crystal increases to that desired or is slightly higher the elevation on the disc 9 closes the apertures 7—7, the disc 9 occupying the position shown in Fig. 3. As the temperature again falls below that desired, the apertures are again opened and the process repeated.

In order to insure the maintenance of a constant temperature in the chamber containing the heat responsive element, regardless of any excessive amount of heat dissipated by parts of the system contained in the other chamber, the walls of chamber 4 have a thinner wall construction or are constructed of a material which has less heat retaining properties than the walls of chamber 3. When an excessive amount of energy is dissipated by parts of the system contained in chamber 3— considerably above that necessary to maintain the thermal responsive element at the desired temperature—some of the fluid medium of chamber 3 tends to leak through the thermostatically controlled valve 9 even through the valve between the chambers is closed. With this construction of the chambers, however, a greater amount of heat is radiated per unit area exposed to the ambient temperature from chamber 4 than from chamber 3. Accordingly this relatively more rapid cooling of chamber 4 prevents any excessive increase in temperature of the fluid medium of that chamber.

Another means of obtaining this result is the movable plate 20 partly exposed to the ambient temperature and partly contained in the chamber 4. Since the metal of this plate conducts heat readily the chamber 4 becomes cool more rapidly with a result similar to that secured by the above stated means. A feature of the use of the movable plate is that the degree of cooling effected may be varied by exposing a greater or less proportion of the plate to the ambient temperature.

The particular embodiment described is illustrative and is not to be construed as a limitation of the scope of this invention. Various modifications utilizing the principle of this invention for the maintenance of the temperature of a closed space containing a thermal responsive element with the energy dissipated by part or the whole of the system may be employed without diverting from the scope of this invention.

What is claimed is:

1. In combination, an electrical system which dissipates heat in its normal opration and which includes a thermal responsive control element, a heat retaining chamber in which said thermal responsive control element is located and means for maintaining the temperature of said chamber between predetermined limits comprising means for adjustably heating said chamber with heat dissipated in the normal operation of said system.

2. In combination an oscillator comprising a thermal responsive element and a heat dissipating device, a system for regulating the temperature of said element comprising conserving means for storing the heat dissipated in the normal operation of said device and means for supplying the heat stored by said conserving means to maintain said element at a relatively constant temperature.

3. In combination an oscillator including a thermal responsive element and a device which dissipates heat in its normal operation, a system for maintaining said thermal responsive element at a constant temperature comprising means for supplying the heat dissipated by said device to said element and means for maintaining the temperature of said element within predetermined limits.

4. A method of maintaining the temperature of a piezoelectric crystal of an oscillator at a constant temperature comprising storing the energy dissipated in the normal operation of said oscillator and supplying said stored energy to said element as required to maintain said element at a constant temperature.

5. A method of maintaining the temperature of a thermal responsive element of an electrical system at a constant temperature comprising storing the energy dissipated in the normal operation of said system and supplying said stored energy in selected amount to said element.

6. In a mechanically controlled oscillator comprising a mechanical vibratory member and a heat dissipating device, a system for maintaining said member at a desired temperature comprising two chambers, a common connecting wall having an aperture therein between said chambers, one of said chambers containing said heat dissipating device, the other of said chambers containing said member, and means responsive to temperature changes in said chamber containing said member for opening and closing said aperture.

7. A piezoelectric oscillator comprising a space discharge device and a piezoelectric element, two heat retaining chambers, one of said chambers containing said piezoelectric element and the other of said chambers containing said space discharge device, means for intermixing the fluid medium of the two chambers and means responsive to temperature changes in said piezoelectric chamber for controlling said first stated means.

8. A system for maintaining a mechanical vibratory member of an oscillator at a desired temperature including, a thermostatically controlled valve comprising rotatable means for opening and closing an aperture and a bimetallic coil responsive to temperature changes for rotating said rotatable means.

9. An electrical system including, a first heat retaining chamber, a second heat retaining chamber, a source of heating energy in said second chamber, means for maintaining the temperature of said first chamber at a relatively constant temperature by the heated fluid medium of said second chamber and means comprising a movable metallic member located in said first chamber and extending externally thereof for preventing excessive temperature increases therein.

10. In combination, two heat retaining chambers, one of said chambers having greater heat retaining properties than the other of said chambers a source of heating energy located in said chamber having the greater heat retaining properties and means for supplying the heated fluid medium of said chamber having greater heat retaining properties to the other of said chambers.

11. An oscillator including a space discharge device and a piezoelectric crystal for controlling the frequency of said oscillator and means whereby said space discharge device maintains said crystal at a temperature higher than the ambient with the heat dissipated in the normal operation of said device in said oscillator.

12. In combination, a first heat retaining chamber, a second heat retaining chamber having greater heat retaining properties than said first chamber, an electric system which dissipates heat in its normal operation located in said second heat retaining chamber, and means for supplying the heated fluid medium from said second chamber to said first chamber.

13. Apparatus for maintaining the temperature of a piezoelectric element of an electrical system at a constant temperature comprising means for supplying the energy dissipated in the normal operation of said system as required to maintain said element at a constant temperature.

14. In combination, an oscillator including a thermal responsive control element and a heat dissipating device, a system for regulating the temperature of said element including conserving means for storing the heat dissipated in the normal operation of said device, and means for supplying the heat stored by said conserving means to said element to maintain the temperature of said element within desired limits.

15. In combination, an oscillator including a thermal responsive control element and a device dissipating heat in its normal operation, a system for regulating the temperature of said element including means for supplying the heat dissipated by said device to said element, and means for maintaining the temperature of said element within desired limits.

16. The method of maintaining the temperature of a thermal responsive element of an electrical system within desired limits which includes the steps of storing the energy dissipated in the normal operation of said system and supplying said stored energy in selected amount to said element.

17. An electrical system having a part thereof continuously dissipating heat in the normal operation thereof, means for controlling the frequency thereof, and means for selectively controlling the temperature of said frequency controlling means with said heat.

18. An electrical system having a part thereof continuously dissipating heat in the normal operation thereof, piezoelectric means, and means for selectively controlling the temperature of said piezoelectric means with said heat.

19. Apparatus including heat retaining means having a plurality of sections, an oscillator circuit having a heat producing part thereof disposed within one of said sections and a frequency control element disposed within another of said sections, and means disposed in said last-mentioned section for selectively controlling the temperature conditions therein around said element with heat from said heat producing part.

20. An electrical system having a part thereof dissipating heat in the normal operation thereof, frequency control means, means having an opening for the passage therethrough of said heat to said frequency control means, and means for selectively regulating the size of said opening and controlling the temperature of said frequency control means.

21. An electrical system including a piezoelectric crystal, a space discharge device for supplying heat to said crystal, means having an opening therein, and means for selectively controlling the amount of said heat passing through said opening to obtain a desired temperature for said crystal.

22. An electrical system including a piezoelectric crystal, a space discharge device for supplying heat to said crystal, a chamber enclosing said device, a chamber enclosing said crystal and having walls of less heat retaining properties than those of said first-mentioned chamber, a wall separating said chambers and having an opening therein interconnecting said chambers, means responsive to the temperature within said crystal chamber for selectively controlling the amount of said heat supplied thereto through said opening to obtain a desired temperature for said crystal, and means for conducting excess heat from said crystal chamber.

23. A radio system including a frequency controlling piezoelectric crystal, a heat producing space discharge device for supplying heat energy to said crystal, a heat retaining chamber enclosing said space discharge device, a heat retaining chamber enclosing said crystal, disposed above said chamber enclosing said device and having walls thinner in cross-section and of less heat retaining properties than those of said chamber enclosing said device, the inner walls of said chambers having metallic lining, a heat insulating wall separating said chambers and having a plurality of apertures therein interconnecting said chambers, means responsive to the temperature within said crystal chamber for selectively controlling the amount of said heat supplied thereto to obtain a desired temperature for said crystal comprising a shaft, means for pivotally mounting said shaft in said crystal chamber, rotatable disc valve means secured to said shaft for selectively regulating the effective size of said apertures, means including a coiled bimetallic thermostat secured to said shaft for rotating said disc valve means in accordance with the temperature in said crystal chamber to obtain said desired temperature for said crystal, and means for conducting excess heat from said crystal chamber including a metallic plate extending externally of said crystal chamber and being longitudinally slidable in a groove in said inner wall adjacent said metallic lining of said crystal chamber.

GEORGE M. THURSTON.